United States Patent
McIntosh et al.

(10) Patent No.: US 7,185,326 B2
(45) Date of Patent: Feb. 27, 2007

(54) AUTOMATICALLY REORDERING VARIABLES AS A PART OF COMPILING AND LINKING SOURCE CODE

(75) Inventors: Nathaniel McIntosh, Santa Clara, CA (US); Dmitry Mikulin, San Carlos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 638 days.

(21) Appl. No.: 10/632,189

(22) Filed: Jul. 30, 2003

(65) Prior Publication Data

US 2005/0027953 A1   Feb. 3, 2005

(51) Int. Cl.
   *G06F 9/45*   (2006.01)
(52) U.S. Cl. .................. 717/151; 717/140; 717/141
(58) Field of Classification Search ........ 717/140–141, 717/159–162, 151
   See application file for complete search history.

(56) References Cited

U.S. PATENT DOCUMENTS

| 5,940,621 A * | 8/1999 | Caldwell | 717/156 |
| 6,134,708 A * | 10/2000 | Yui | 717/143 |
| 2002/0087956 A1 * | 7/2002 | Darlet | 717/159 |

* cited by examiner

*Primary Examiner*—Meng-Al T. An
*Assistant Examiner*—Willliam H. Wood

(57) ABSTRACT

Methods and Systems for automatically reordering variables as a part of compiling and linking source code. In one embodiment, a compiler identifies a set of variables that are candidates for reordering. The candidate variables are associated with one or more source code files that are being compiled. The compiler collects data used for determining a potential layout of the candidate variables. The linker determines the potential layout based, at least in part, on the data and reorders the candidate variables based, at least in part, on the potential layout.

22 Claims, 3 Drawing Sheets

US 7,185,326 B2

AUTOMATICALLY REORDERING VARIABLES AS A PART OF COMPILING AND LINKING SOURCE CODE

TECHNICAL FIELD

Embodiments of the present invention relate to techniques for obtaining faster execution of a program. More specifically, embodiments of the present invention relate to automatically reordering variables to obtain faster execution of a program that results from compiling and link-editing source code.

BACKGROUND ART

As the need for programs, such as database applications, to process more and more data increases, there is an increasing need for the programs to execute faster. For example, database applications may run for days as they process data in a database. Decreasing the execution time of such applications by even a few percent is highly beneficial.

One technique for improving the performance of programs is to reorder the variables associated with the program to improve the pattern of accessing the variables. For example, typically, the source code files, associated with a particular program, have an area for code and another area for data, such as read-only variables (also known as "constants") and writeable variables (hereinafter, the term "variables" shall be used to refer to read-only and/or writeable variables). The source code files are compiled to produce object files. Typically there is one object file per source code file. The object files are linked together to produce an executable. When the executable is loaded and executed, the variables of the program reside within a region of computer memory known as the "data segment".

Frequently, the variables in the "data segment" are cached as the executable is executed to decrease the time it takes the executable to access the variables. Since, cache memory is relatively small in comparison to the size of the "data segment", choices have to be made as to how long the variables reside in the cache memory.

The order of the variables within the "data segment" impacts the utilization of cache memory. For example, if a frequently-accessed variable X is next to an infrequently accessed variable Y in the "data segment", the infrequently accessed variable Y maybe loaded (also known as a "fetch") into the cache memory as a result of the frequently-accessed variable X being loaded into the cache memory. First, loading Y as a part of loading X results in less space in the cache memory for loading other variables that may be accessed more frequently than Y and secondly, may result in another frequently accessed variable Z being removed (also known as "evicting") from the cache memory. Third, if Z is needed again (also known as a "cache miss"), it will have to be reloaded/fetched into the cache memory. The increase in fetches and cache misses, due to poor variable layout in the "data segment", increases the execution time of the program.

Most compilers do not reorder variables. Instead, the variables are ordered in the sequence the linker receives the variables. To date, reordering variables has only been done in the research community as a part of scientific and/or numerical programs. The researchers would analyze the source code to determine a better way of ordering the variables. However, it is impossible for people to understand the millions/billions of lines of code in large programs. Therefore, only small portions of the programs can be optimized. Similarly, the result of human analysis is frequently faulty. For example, a person may think, based on the portion of code they were able to comprehend, that variable C should be placed after variables A and B, when in reality it would be better to place variable D after A and B. Furthermore, the poor quality of the variable layout resulted in increasing the size of the executable and in increasing the amount of memory used while running the executable. As mentioned, since human involvement was needed, reordering variables has only been done in the research community for scientific and numerical programs. Therefore, commercial applications, such as database applications, could not utilize this technique.

For these and other reasons, a need exists for providing automatic reordering of variables. A further need exists for providing comprehensive reordering of variables. A further need exists for providing automatic reordering of variables in a manner that can be used in commercial applications.

DISCLOSURE OF THE INVENTION

The present invention provides automatic reordering of variables. The present invention provides comprehensive reordering of variables. The present invention provides reordering of variables in a manner that can be used in commercial applications.

Embodiments of the present invention which pertain to methods and systems for automatically reordering variables are described. In one embodiment, a compiler identifies a set of variables that are candidates for reordering. The candidate variables are associated with one or more source code files that are being compiled. The compiler collects data used for determining a potential layout of the candidate variables. The linker determines the potential layout based, at least in part, on the data and reorders the candidate variables based, at least in part, on the potential layout.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Hardware Overview

Figure 1:
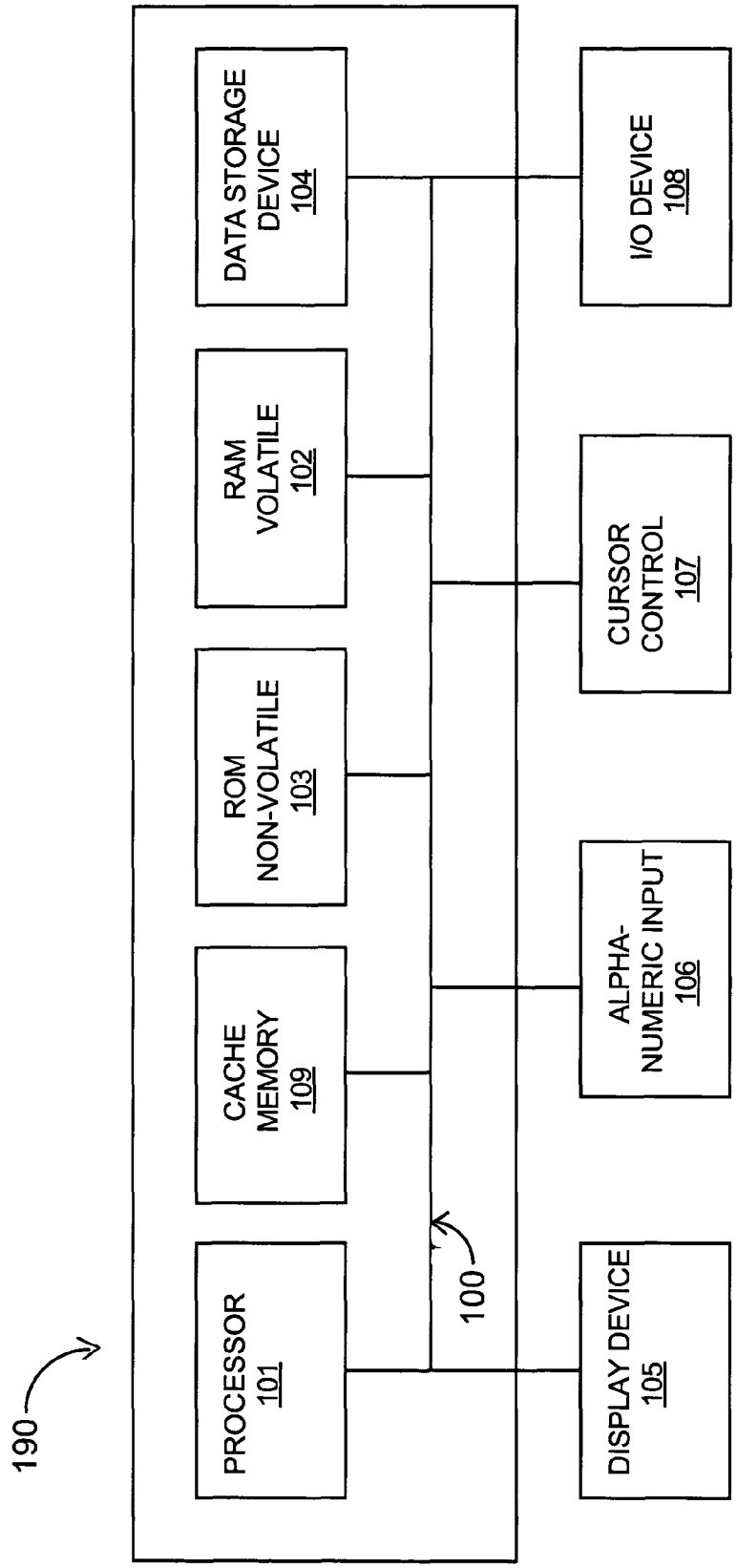
FIG. 1 is a block diagram of an exemplary computer system upon which embodiments of the present invention may be implemented.

FIG. 1 illustrates an exemplary computer system 190 upon which embodiments of the present invention may be practiced. In general, computer system 190 comprises bus 100 for communicating information, processor 101 coupled with bus 100 for processing information and instructions, random access (volatile) memory (RAM) 102 coupled with bus 100 for storing information and instructions for processor 101, read-only (non-volatile) memory (ROM) 103, coupled with bus 100 for storing static information and instructions for processor 101, cache memory 109 data storage device 104 such as a magnetic or optical disk and disk drive coupled with bus 100 for storing information and instructions, an optional user output device such as display device 105 coupled to bus 100 for displaying information to the computer user, an optional user input device such as alphanumeric input device 106 including alphanumeric and function keys coupled with bus 100 for communicating information and command selections to processor 101, and an optional user input device such as cursor control device 107 coupled to bus 100 for communicating user input information and command selections to processor 101. Furthermore, an optional input/output (I/O) device 108 is used to couple computer system 190 onto, for example, a network.

Display device 105 utilized with computer system 190 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Software System and Functional Overviews

Figure 2:
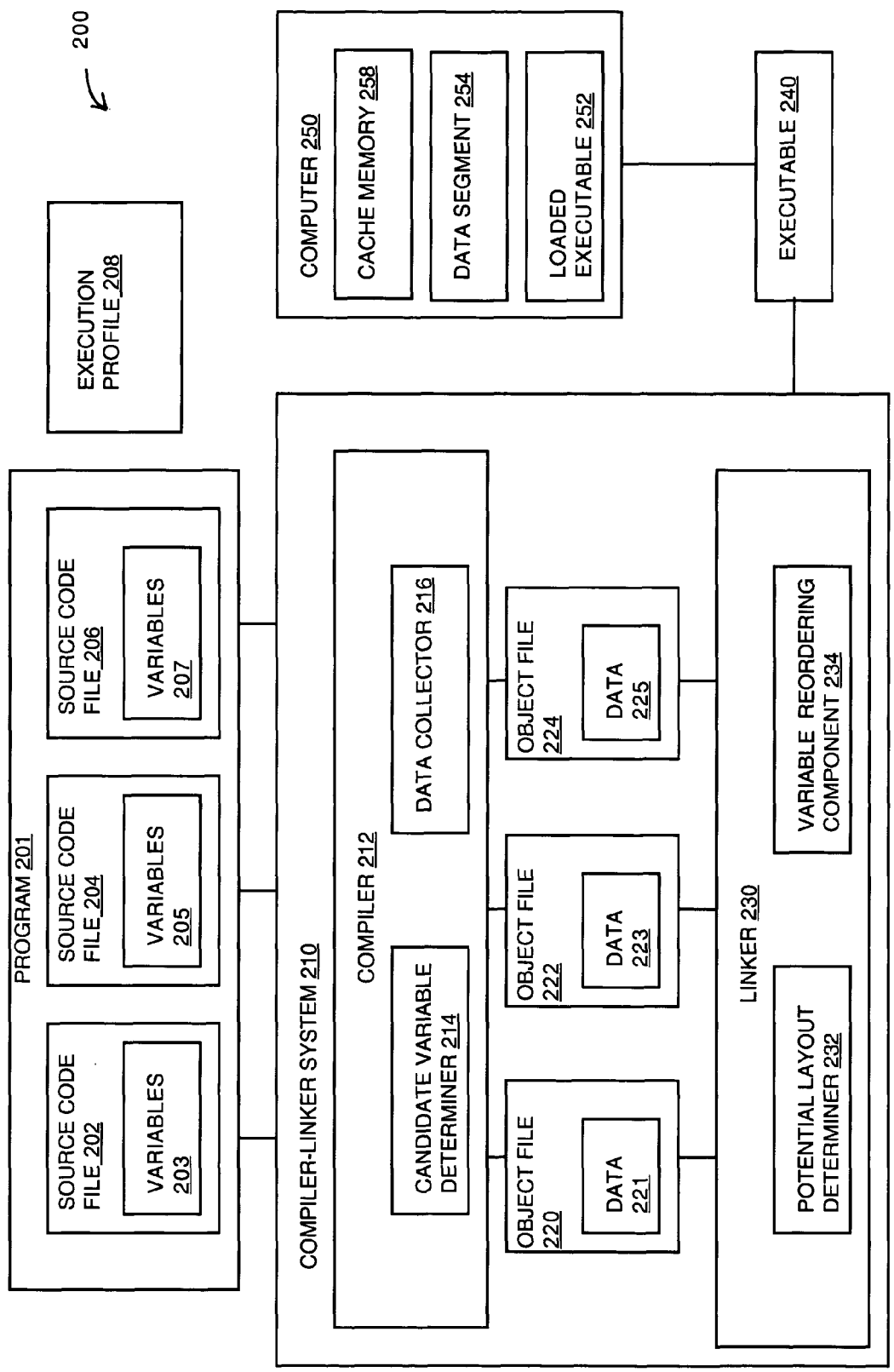
FIG. 2 is a block diagram of an exemplary software system in which embodiments of the present invention may be implemented.

FIG. 2 is a block diagram of an exemplary software system in which embodiments of the present invention may be implemented. The blocks in FIG. 2 may be arranged differently than as illustrated, and may implement additional features that are not described herein.

In the present embodiment, the software system 200 includes source code files (202, 204, 206) for a program 201, an execution profile 208, a compiler-linker system 210, an executable 240, and a computer 250. The compiler-linker system 210 includes, among other things, a compiler 212 for compiling the source code files (202, 204, 206) to produce object files (220, 222, 224) and a linker 230 for link-editing object files (220, 222, 224) together to produce the executable 240. The executable 240 is executed on the computer 250. Computer 250 includes a cache memory 258 for caching data associated with executables that are run on computer 250. When the executable 240 is loaded into computer 250 for execution, a data segment 254 with variables (203, 205, 207) is created and the loaded executable 252 accesses the variables of the data segment 254. As the loaded executable 252 is run, variables of data segment 254 may be cached in cache memory 258. Although FIG. 2 depicts data segment 254 outside of the loaded executable 252, in one embodiment, data segment 254 may reside inside of the loaded executable 252.

In the present embodiment, the source code files (202, 204, 206), each include variables (203, 205, 207). Further, the source code files (202, 204, 206) may include instructions, which access the variables (203, 205, 207).

As a part of compiling in the present embodiment, a candidate variable determiner 214 determines which variables of the source code files' (202, 204, 206) variables (203, 205, 207) are candidates for reordering (referred to herein as "candidate variables"). In one embodiment, global and/or static variables are candidates for reordering. In the present embodiment, a data collector 216 collects data (221, 223, 225) for determining a potential layout of the candidate variables. The compiler-linker system 210 associates the data (221, 223, 225) respectively with each of the object files (220, 222, 224).

In the present embodiment, an execution profile 208 is used in determining which variables are candidate variables and in providing information that may be used for determining how to reorder these candidate variables. Execution profiles provide information that can be used to determine how frequently variables are accessed (referred to herein as "access counts") and how closely variables (203, 205, 207) are accessed to each other in time (referred to herein as "affinity"). For example, if a variable x is accessed 5 times during execution, the variable x is said to have an access count of 5. If a variable y is accessed within 2 nanoseconds of x and within 3 nanoseconds of z, then y is said to have a higher affinity to x than to z. Execution profiles are well understood by those with ordinary skill in the art of compilers and will be described in more detail hereinafter.

In the present embodiment, the candidate variable determiner 214 uses the execution profile 208 to determine what variables of the source code files' (202, 204, 206) variables (203, 205, 207) are the candidates for reordering by analyzing the access counts and the affinities associated with variables 203, 205, 207.

In the present embodiment, the data collector 216 collects data (221, 223, 225) that is used for determining how to reorder the candidate variables. In one embodiment, the collected data (221, 223, 225) may include, among other things, data indicating what the candidate variables are (such as the names of the candidate variables), the access counts of the candidate variables, affinities that the candidate variables have to one another, and variable classifications. The term "statistics" shall be used herein to refer to access counts, affinities, and variable classifications, among other things. In one embodiment, variable classifications include, among other things, variable initialization class (initialized or uninitialized), variable size, variable alignment constraint, and variable storage class (read-only or writeable), as will be discussed in more detail. The collected data (221, 223, 225) is stored into the respective object files (220, 222, 224) to communicate the collected data (221, 223, 225) to the linker 230. In one embodiment, each candidate variable is stored in its own section of the object files.

In the present embodiment, the candidate variables for each source code file, as well as the statistics, are stored separately in the object files that correspond to the source code files associated with the candidate variables. For example, object file 220 is a compiled version of source code file 202 so the candidate variables from variables 203, as well as the statistics for the candidate variables for source code file 202, may be stored in data 221.

In the present embodiment, the linker 230 receives and link-edits object files (220, 222, 224) together to produce executable 240. Since the linker 230 receives all object files (220, 222, 224) which were compiled from all of the source code files (203, 205, 207), linker 230 has access to all of the data (221, 223, 225) collected while compiling program 201. In one embodiment, the linker 230 summarizes the statistics for the candidate variables, as will be described in more detail. In one embodiment, the linker 230 partitions the candidate variables into categories. For example, the linker 230 may use the variable classifications to partition the candidate variables into categories, as will be described in more detail.

In the present embodiment, a potential layout determiner 232 analyzes the data (221, 223, 225) to determine a potential layout of the candidate variables, as will be described in more detail. In the present embodiment, a variable reordering component 234 uses the potential layout to reorder the candidate variables. In one embodiment, the linker 230 recalculates the addresses of the reordered variables.

In the present embodiment, when the executable 240 is loaded and executed on a computer 250, a data segment 254 of the loaded executable 252 includes the reordered variables resulting in improved performance. For example, the layout of the reordered variables affects how the variables are loaded and removed from the cache memory 258, among other things.

Execution Profile

Typically to create an execution profile 208, the source code files (202, 204, 206) associated with a particular program 201 are compiled and link-edited together to produce an executable that does not have its variables reordered. This executable is executed with workloads that are representative of how the executable would be executed in a real system, during which, information that can be used to determine, among other things, access counts and affinities, is collected and used to create an execution profile 208.

In the present embodiment, the source code files (202, 204, 206) are compiled and link-edited a second time using the execution profile 208. This time, the execution profile 208 is used in determining which variables are candidates for reordering and in providing information that may be used for determining how to reorder these candidate variables, as described in more detail hereinafter.

Data Collection

In one embodiment, for each source code file (202, 204, 206) in the program 201 being compiled, the compiler 212 builds a control flow graph (CFG). The compiler 212 may annotate each block, which represents a sequence of instructions in program 201, in the CFG with an access count corresponding to the measured (or predicted) frequency of the block is executed according to the execution profile.

The compiler 212 then scans each block, looking for instruction sequences that correspond to global or static variable accesses. For example, when the data collector 216 locates an access to a variable X, the data collector 216 determines the execution frequency of the block containing X, then adds this value to the "access count" for X in a table.

In one embodiment, at the end of this process, the data collector 216 has built one table per source code file (202, 204, 206) which includes information about the candidate variables. In one embodiment, each table entry may include a variable identifier, the access count for the variable, as well as the variable's size, alignment constraint, storage class (writeable or read-only), and initialization class (initialized or uninitialized). In one embodiment, the access count for the variable is accumulated across all accesses of the variable within the program 201. In one embodiment, these tables may be stored in the data (221, 223, 225) for each object file (220, 222, 224) for program 201.

Summarizing Information

In the present embodiment, linker 230 summarizes the data (221, 223, 225) for all the object files (220, 222, 224) of program 201. In one embodiment, the linker 230 summarizes the data (221, 223, 225) for the candidate variables into tables. Each table entry may include a variable identifier, the total access count for the variable, as well the variable's size, alignment constraint, storage class (writeable or read-only), and initialization class (initialized or uninitialized).

Categorizing Candidate Variables

In the present embodiment, the linker 230 has access to all of the data (221, 223, 225), which may include variable classifications, such as the variable initialization class, etc. In one embodiment, the linker 230 may use the variable classification to partition the candidate variables into categories, such as small read-only, large read-only, small writeable, large initialized writeable, and large uninitialized writeable.

Typically, the variables that are declared as constants in source code files are read-only and the variables that are not declared as constants are writeable. For example, in the C programming language "const c=1.0" is an example of a constant c that is set to the value 1.0. The value of c cannot be modified during the execution of the executable that includes the instruction "const c=1.0". Similarly "int z" is an example of a variable that can be modified during the execution of the executable that includes the instruction "int z". For example, the executable may set z to the value 2 and then later set z to the value of 10.

Typically, writeable variables may be declared as either initialized or uninitialized in source code files. For example, "int z=2" is an example of a variable z that is initialized to the value of 2, whereas, "int y" is an example of a variable y that is uninitialized. Typically, loaders cause uninitialized variables to be initialized to zero. As will be seen later, this can be used to optimize the reordering of variables.

In one embodiment, variables may be categorized as large or small. In one embodiment, the variables that can fit into one line of a cache memory (referred to herein as a "cache line") are small and variables that cannot fit into one line of the same cache memory are large. For example, if each line of a cache memory is 16 bytes, then variables smaller than or equal to 16 bytes are small variables and variables that are larger than 16 bytes are large variables. In one embodiment, variables of unknown size are treated as large variables.

As previously mentioned, in one embodiment, the linker 230 may use the variable classifications to partition the candidate variables into various categories, such as small read-only, large read-only, small writeable, large initialized writeable, and large uninitialized writeable. In this embodiment, both small initialized writeable and small uninitialized writeable are partitioned into the same category, e.g., small writeable category. Since loaders typically cause the storage assigned to uninitialized variables to be zeroed out, the small uninitialized variables can be assigned to the same category as the small initialized variables, which results in enhanced caching of small variables, as will be discussed in more detail.

In one embodiment, the candidate variables maybe partitioned into fewer categories. For example, a particular program may not have any read-only variables.

The Potential Layout

In the present embodiment, candidate variables associated with object file's (220, 222, 224) data (221, 223, 225) are analyzed to determine how the candidate variables may be reordered. For example, assuming that candidate variables "a" and "b" are associated with data 221, candidate variables "l" and "m" are associated with data 223, and candidate variables "x" and "y" are associated with data 225, a potential layout determiner 232 may analyze "a", "b", "l", "m", "x", and "y", to determine if these variables should be reordered.

In the present embodiment, the access counts and affinities may be used, among other things, in determining how to reorder "a", "b", "l", "m", "x", and "y". For example, the potential layout determiner 232 may score the variables based on an algorithm that uses, among other things, the access counts and affinities to reorder the variables based on their corresponding score, as will be described in more detail.

In one embodiment, the candidate variables are partitioned into categories and the candidate variables are reordered within their respective categories. For example, assume that "a", "l", "x" are small read-only variables, "b", "m", "y" are large read-only variables. The small read-only variables "a", "l", "x" may be analyzed and reordered separately from variables "b", "m", "y". Assuming that the small read-only variables "a", "l", "x" are reordered as "l", "a", "x" and the large read-only variables are reordered as y, m, b, the potential layout may be "l", "a", "x", "y", "m", "b".

In one embodiment, the potential layout is a linear list designating a relative order the linker 230 may use for reordering the candidate variables. In one embodiment, the potential layout is divided into separate sections. The separate sections may be thought of as different potential layouts for each of the categories the candidate variables are associated with. For example, there may be a potential layout for the small read-only variables, another potential layout for the large read-only variables, etc. In this case, continuing the example above, the potential layout for the small read-only variables may be "l", "a", "x", and the potential layout for the large read-only variables may be "y", "m", "b".

Small Variables and the Virtual Cache Line

In one embodiment, a "virtual cache line" is a virtual representation of a cache line in a cache memory 258. For example, if the lines of cache memory 258 are each 16 bytes long, then the virtual cache line that represents cache memory 258's lines is 16 bytes long. In one embodiment, the virtual cache line is the maximum line size of the level 1, 2, and 3 cache memories on the computer executing the executable 240 produced by a compiler-linker system 210. For example, if level 1's cache lines are 16 bytes long, level 2's cache lines are 32 bytes long, and level 3's cache lines are 64 bytes long, then the virtual cache line is 64 bytes long.

In one embodiment, a virtual cache line may be used in determining the order that the small variables are associated with the potential layout. For example, the potential layout determiner 232 of linker 230 may analyze the small variables, which the data (221, 223, 225) indicates are candidate variables, one at a time to determine how the small variables may be reordered. In one embodiment, various criteria, as will be described in more detail, may be used to determine the order for associating the small variables with the virtual cache line. When the virtual cache line is full, the variables are associated with the potential layout in the same order that they were associated with the virtual cache line.

In one embodiment, the access counts of the small variables may be used, among other things, in determining the potential layout of the small variables. For example, small variables may be associated with the virtual cache line starting with small variables that have the highest access count and ending with the lowest access count.

In one embodiment, the affinities between various small variables, among other things, may be used to determine the potential layout of the small variables. For example, small variables may be associated with the virtual cache line starting with small variables that have the highest affinity to other small variables and ending with the lowest affinity.

In one embodiment, selecting the next variable to associate with a virtual cache line is based on more than one variable already associated with the virtual cache line. For example, if two small variables "a" and "b" have already been associated with the virtual cache line, the selection of the next small variable "x" may be based on the affinity of "x" to "a" and "b". In yet another example, x maybe selected because "x" has a lower access count than "a" and "b", but a higher access count than the other small variables that are candidates for reordering.

In prior art systems, the next small variable to associate with the virtual cache line was only based on the last variable associated with the virtual cache line. To continue the example, assume that either "x" or "e" may be selected as the next variable to associate with the virtual cache line. Further, assume that affinity of "x" to "a" and "b" is higher than affinity of "e" to "a" and "b". However, since the prior art systems only compare the affinity between "b" and "x" to the affinity between "e" and "b", "e" may erroneously be selected as the next variable to be associated with the virtual cache line.

In one embodiment, the byte alignment constraints, among other things, associated with the small variables may be used for determining the potential layout of the small variables. For example, some variables need to be aligned on a 2 byte boundary, others need a 4 byte boundary, and yet others need an 8 byte boundary. These alignment constraints may be reflected in how variables are placed in a cache line. Continuing the example of a 16 byte long cache line. This cache line can be thought of as consisting of eight 2 byte sections. The first 2 byte section starts at position 0 of the cache line, the second 2 byte section starts at position 2 of the cache line, the third 2 byte section starts at position 4 of the cache line, and so on. A variable placed at positions 0 or 8 would be 2, 4 and 8 byte aligned. A variable placed at positions 4 or 12 would be 2 and 4 byte aligned. A variable at positions 2, 6, or 14 would be 2 byte aligned.

Assuming that a 10 byte variable "x" resides in the 16 byte cache line, if a variable "y", which requires a 4 byte alignment, is loaded into the virtual cache line, 2 bytes of padding will need to be placed between variable "x" and variable "y" so that variable "y" is placed at position 12 of the virtual cache line.

In one embodiment, small variables are ordered to avoid the introduction of padding. Continuing the example, loading three two byte variables after "x", which only require two byte alignment, after variable "x" would avoid the two bytes of padding that loading variable "y" would require.

In one embodiment, small variables with the same variable alignment constraints are reordered together. For example, if variables "a", "b", and "c" need to be 4 byte aligned and variables "x", "y", and "z" need to be 8 byte aligned, variables "a", "b", and "c" are reordered as a group and variables "x", "y", and "z" are reordered as a group, thus, avoiding the introduction of padding.

In one embodiment, heuristics are used for determining the ordering of the small variables. Variables may be selected based on a combination or weighting of access accounts and affinities, among other things. For example, assume two small variables "a" and "b" have already been associated with the virtual cache line, "x" may be selected based on both the access count of "x" and the affinity of "x" to "a" and "b". In a second example, "x" maybe selected because a weighted average of the access count of "x" and the affinity of "x" to "a" and "b" is lower than the previously computed weighted averages for "a" and "b", but higher than the weighted average for other small variables that are candidates for reordering. In a third example, "x" may be selected because the affinity of "x" to "a" and "b" is high even though associating "x" with the virtual cache line would introduce padding. Similarly "x" may be selected because the access count of "x" is high even though associating "x" with the virtual cache line would introduce padding.

In one embodiment, all of the small writeable variables are ordered separately from all of the small read-only variables. For example, if variables "a", "b", and "c" are small writeable variables and "d", "e", and "f" are small read-only variables, "a", "b", and "c" will be reordered separately from "d", "e", and "f".

Table 1 depicts an exemplary algorithm that may be used for selecting variables to associate with a virtual cache line. This algorithm is only provided for the purposes of illustration. In this example, "S" is the set of all the short read-only variables that are candidates for reordering (the algorithm illustrated in Table 1 can also be used for short writeable variables). The short variables that are associated with S are analyzed to determine the order in which to associate them with a virtual cache line V. In the exemplary algorithm, byte alignment constraints, access counts, and affinities between variables, are used in determining the order of associating small variables with V.

When another small variable can not be associated with virtual cache line V without exceeding V's size, the small variables associated with V are associated with the potential layout in the same order that they were associated with V. Then V is used to determine the order of the next batch of variables from S.

TABLE 1

Exemplary algorithm

Inputs:
A) "S" is a set of short variables.
B) The following are associated with each short variable in "S".
   i) size in bytes
   ii) alignment requirement in bytes
   iii) raw access count
   iv) the variable's affinity to other variables in "S".
   In one embodiment, a variable affinity map is used. A variable
   affinity map is a symmetric relationship that maps each pair of
   variables to an integer "score" that represents the affinity
   between the two variables.
D) The cache line size in bytes (the maximum line size of level 1, 2, and 3 cache memories).
Outputs:
A) The order of short variables that were associated with the virtual cache line "V".
While S is not empty
{
   Select an initial candidate "I" based solely on I's access count.
   Remove I from S.
   Associate I with the virtual cache line V.
   Repeat adding short variables from S to V until the addition of
   another short variable would exceed the size of V:
   {
      For each small variable "X" in S:
      {
         Determine whether X can be associated with the
         virtual cache line V without exceeding the size of V
         while allowing for any alignment constraints that
         associating X with V may result in.
         Compute a "score" for X that estimates the benefit
         of associating "X" with the virtual cache line V by
         adding the raw access count of X with the affinities
         between X and the other small variables already
         associated with V.
         Keep track of all the scores for all of the small
         variables in S.
      }
      Find the small variable N in S that has the highest score.
      Determine the position in virtual cache V to associate N
      with. Assuming there are already SV small variables in V
      that fill up P positions, evaluate whether N can be
      associated with any of the positions P+1 allowing for the
      alignment constraints of N and the size of N, without
      exceeding the size of V. In one embodiment, N is
      associated with V after the small variables SV, which were
      associated with V prior to the selection of N.
   }
   Associate all of the small variables in V with the potential layout
   in the same order that the small variables were associated with V
   in the above algorithm.
}

In one embodiment, both the initialized and the uninitialized small writeable variables are partitioned into the same category. If there is a strong affinity between two variables, then there is a high probability that if one of the variables is accessed then the other variable will also be accessed. Thus, it is better to load variables that have strong affinities to each other together rather than variables that have weak affinities. For example, assume that there is a weak affinity between small initialized writeable variables "A" and "C", however "A" has a strong affinity to a small uninitialized writeable variable "B". It would be preferable to have A and B loaded in the cache memory rather than A and C.

Large Variables

Many of the techniques already described for reordering small variables involving access counts, affinities between variables, and heuristics, may also be used for reordering large variables.

In one embodiment, the first large variable selected for reordering is the most frequently accessed variable. For example, assume that S is a set of all the large writeable variables that are candidates for reordering. If the variable X has the highest access count of all the variables in S, it may be selected as the first variable to associate with the large writeable variable section of the potential layout.

In one embodiment, the subsequent variables selected have a higher access count than the remaining variables. For example, if Y has a higher access count than the rest of the variables in S, then Y may be associated with the potential layout after X.

In one embodiment, the subsequent variables selected have a higher affinity to the last selected variable than the remaining variables. For example, if Z has a higher affinity to x than the rest of the variables in S, then Z may be associated with the potential layout after X.

In one embodiment, heuristics may be used for determining the ordering of the large variables. For example, variables may be selected based on a combination or weighting of access accounts and affinities.

OPERATIONAL EXAMPLE

Figure 3:
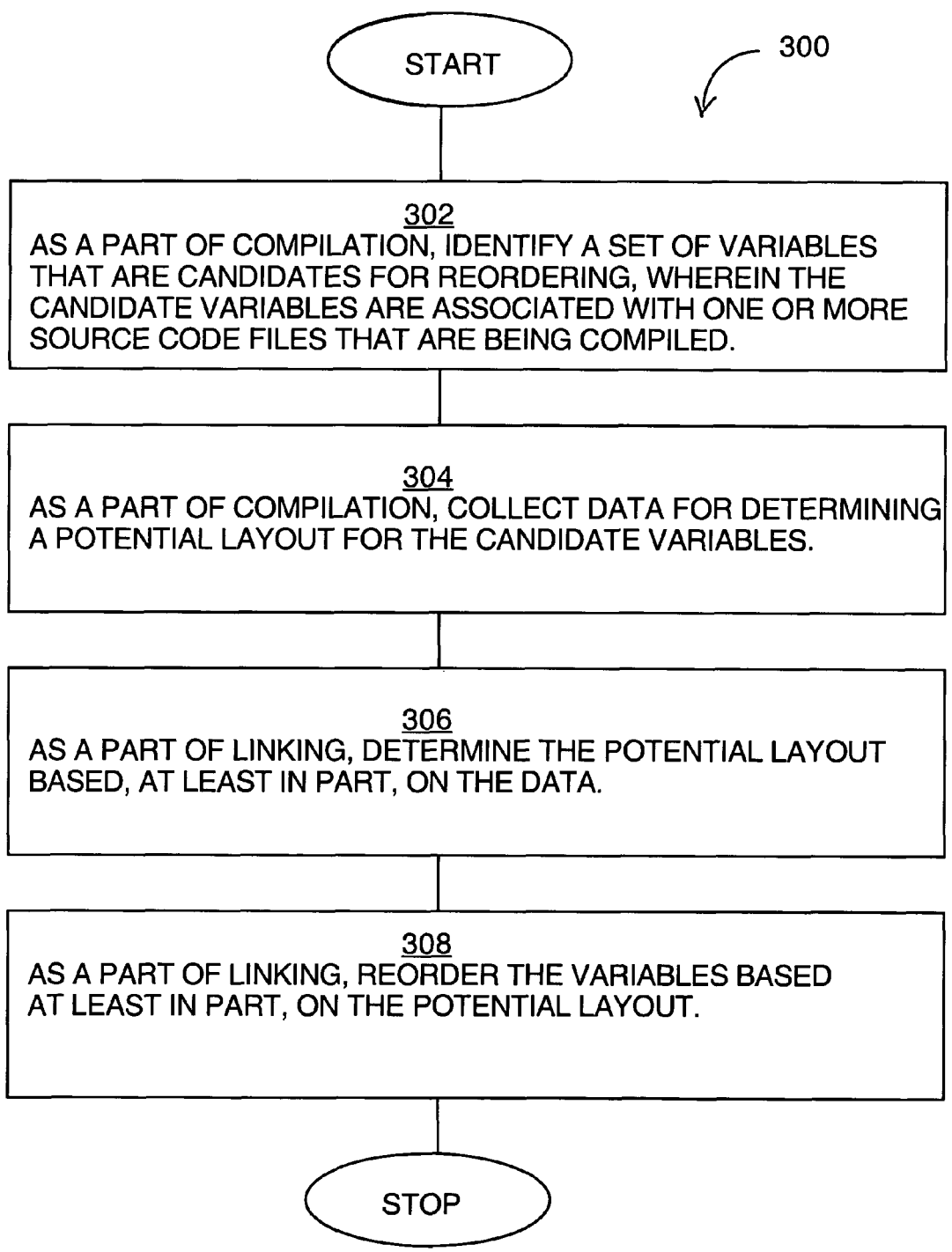
FIG. 3 depicts a flowchart for automatically reordering variables as a part of compiling and linking source code according to embodiments of the present invention.

FIG. 3 depicts flowchart 300 for automatically reordering variables according to embodiments of the present invention. Although specific steps are disclosed in flowchart 300, such steps are exemplary. That is, embodiments of the present invention are well suited to performing various other steps or variations of the steps recited in flowchart 300. It is appreciated that the steps in flowchart 300 may be performed in an order different than presented, and that not all of the steps in flowchart 300 may be performed. All of, or a portion of, the embodiments described by flowchart 300 can be implemented using computer-readable and computer-executable instructions which reside, for example, in computer-usable media of a computer system or like device. In the present embodiment, steps depicted n flowchart 300 may be implemented by the compiler-linker system 210 of FIG. 2. In the present embodiment, the compiler-linker system 210 may be executed on a computer such as computer system 190. In one embodiment, the computer 250, which executes the loaded executable 252, may be a computer such as computer system 290. In this case, the cache memory 109 may be the same as the cache memory 258.

In step 302, a set of variables are identified as candidates for reordering. For example, as a part of compiling the source code files (202, 204, 206), the candidate variable determiner 214 uses the execution profile 208 to determine which variables of the source code files' (202, 204, 206) variables (203, 205, 207) are candidates for reordering.

In step 304, data is collected for determining a potential layout for the candidate variables. For example, as a part of compiling, the data collector 216 collects statistics, such as the access counts of the candidate variables, the affinities between the candidate variables, and the variable classifications. The collected data may be stored in the object files (220, 222, 224) as data (221, 223, 225).

In step 306, the potential layout is determined based, at least in part, on the data. For example, as a part of link-editing object files (220, 222, 224), the potential layout determiner 232 may use the data (221, 223, 225) to determine the potential layout of the candidate variables. In one embodiment, there are separate sections of the potential layout for the different variable categories. For example, the algorithm depicted in Table 1 may be used for ordering small read-only variables as well as ordering small writeable variables in two different sections of the potential layout. Similarly, the techniques described under the "Large Variables" heading may be used for ordering the large read-only variables, the large initialized writeable variables, and the large uninitialized writeable variables into three different sections of the potential layout.

In step 308, the candidate variables are reordered based, at least in part, on the potential layout. For example, as a part of link-editing object files (220, 222, 224), the variable reordering component 234 uses the potential layout to reorder the candidate variables. The linker 230 may recalculate the addresses for variables that have been moved due to the reordering process.

At this point, the compiler-linker system 210, has produced an executable 240 with variables that are reordered. When the executable 240 is loaded for execution into computer 250, the loaded executable 252 accesses the reordered variables of the data segment 254. The small variables of the data segment 254 are cached in cache memory 258.

CONCLUSION

Reordering large and short variables in different sections decreases the time it takes to run an executable which accesses large and short variables because by separating large and short variables, the short variables may be cached in a more efficient manner. Further, there are runtime architecture constraints as to how large and short variables are accessed. For example, one instruction may be used for accessing short variables whereas several instructions may be used for accessing large variables due to runtime architecture constraints. For this reason, as well as other reasons, storing the reordered large and short variables in separate sections provides better execution time.

Assigning the small initialized and uninitialized variables to the same category results in enhanced caching of small variables.

Using a virtual cache line in determining the reordering of small variables improves cache utilization.

Using techniques that avoid padding between small variables results in smaller executables.

When variables are moved due to reordering, the linker recalculates the addresses of the moved variables. Reordering variables according to their assigned categories simplifies the address recalculations the linker performs.

By storing data (221, 223, 225) in the object files (220, 222, 224), the linker 230 not only has sufficient information for making intelligent and comprehensive decisions on how to reorder variables but the reordering can be done automatically. Further, by storing the data (221, 223, 225) compilers, such as compiler-linker system 210, may be made available for compiling large commercial programs, such as database applications.

By storing the data (221, 223, 225) that identifies and describes the candidate variables in separate sections of each of the object files (220, 222, 224) simplifies the process of reordering the candidate variables at link time.

By using an execution profile 208 to provide more information to the compiler-linker system 210, not only can variables be reordered in a more intelligent and comprehensive manner but the variables can be reordered automatically. Further, by using an execution profile 208 compilers, such as compiler-linker system 210, may be made available for compiling large commercial programs, such as database applications.

Summarizing the data (221, 223, 225) for the candidate variables provides information that the linker 230 uses for reordering the candidate variables.

Partitioning the variables by size, storage class, and initialization class facilitates the layout of read-only variables, without losing any savings reaped by placing read-only variables in the text segment.

The method of reordering candidate variables described herein does not significantly degrade the time it takes to compile a program.

According to measurements taken while executing executable that was compiled using embodiments described herein, the execution time improved by approximately 1% for the SPECcpu "integer" benchmarks with base options. A performance gain of 2% was reported for a large database with an IPF "TPCC" benchmark on Itanium.

EXTENSIONS AND ALTERNATIVES

Embodiments of the present invention are thus described. While the present invention has been described in particular embodiments, it should be appreciated that the present invention should not be construed as limited by such embodiments, but rather construed according to the following claims.

What is claimed is:

1. A method for automatically reordering variables, the method comprising:
    as a part of compilation,
        identifying a set of variables that are candidates for reordering, wherein the candidate variables are associated with one or more source code files that are being compiled;
        collecting data for determining a potential layout for the candidate variables;
    as a part of linking,
        determining the potential layout based, at least in part, on the data, wherein the data is used to partition the candidate variables into categories and enables reordering the candidate variables within their respective categories; and
        reordering the variables based, at least in part, on the potential layout.

2. The method of claim 1, wherein determining the potential layout further comprises:
    selecting the next variable to associate with a virtual cache line based on more than one variable already associated with the virtual cache line; and
    indicating that the selected variable is the next variable associated with the potential layout.

3. The method of claim 1, wherein:
    the method further comprises, partitioning the candidate variables into the categories, based at least in part on the data, wherein the categories include at least one of a small read-only category, a large read-only category, a small writeable category, a large initialized writeable category, and a large uninitialized writeable category; and
    the step of determining further comprises, determining the potential layout, at least in part, based on the categories of the candidate variables.

4. The method of claim 1, wherein the data includes at least one of variable access counts, variable affinities, variable alignment constraints, variable classifications, and the candidate variables.

5. The method of claim 4, wherein the variable classifications includes at least one of variable size, initialization class, and storage class.

6. The method of claim 1, wherein the data is stored in one or more object files associated with the one or more source code files, and wherein the method further comprises:
    transmitting the data to a linker by transmitting the object files to the linker.

7. The method of claim 1, wherein:
    the method further comprises, summarizing, during linkage, the data associated with the one or more source code files; and
    the step of determining further comprises, determining the potential layout, at least in part, based on the summarized data.

8. A computer system comprising:
    a memory unit; and
    a processor for executing:
        a compiler that has a variable identifier configured for identifying variables that are candidates for reordering and a data collector configured for collecting data for determining a potential layout for the candidate variables;
        a reordering categorized candidate variable linker that has a potential layout determiner and a reordering categorized candidate variable component, wherein said variable reordering component is configured to automatically reorder a set of candidate variables based, at least in part, on the data for determining a potential layout of the candidate variables, wherein the data is used to partition the candidate variables into categories and enables reordering the candidate variables within their respective categories.

9. The computer system of claim 8, the computer system further comprising:
    the processor coupled to the memory unit, the processor for executing a method for automatically reordering variables, the method comprising:
        identifying, at the variable identifier, the set of candidate variables for reordering, wherein the candidate variables are associated with one or more source code files that are being compiled;
        collecting, at the data collector, data for determining a potential layout for the candidate variables; and
        determining, at the potential layout determiner, the potential layout based, at least in part, on the data.

10. The computer system of claim 9, wherein determining the potential layout further comprises:
    selecting the next variable to associate with a virtual cache line based on more than one variable already associated with the virtual cache line; and
    indicating that the selected variable is the next variable associated with the potential layout.

11. The computer system of claim 9, wherein:
    the method further comprises, partitioning the candidate variables into the categories, based at least in part on the data, wherein the categories include at least one of a small read-only category, a large read-only category, a small writeable category, a large initialized writeable category, and a large uninitialized writeable category; and
    the step of determining further comprises, determining the potential layout, at least in part, based on the categories of the candidate variables.

12. The computer system of claim 9, wherein the data includes at least one of variable access counts, variable affinities, variable alignment constraints, variable classifications, and the candidate variables.

13. The computer system of claim 12, wherein the variable classifications includes at least one of variable size, initialization class, and storage class.

14. The computer system of claim 9, wherein the data is stored in one or more object files associated with the one or more source code files, and wherein the method further comprises:
transmitting the data to the linker by transmitting the object files to the linker.

15. The computer system of claim 9, wherein:
the method further comprises, summarizing, during linkage, the data associated with the one or more source code files; and
the step of determining further comprises, determining the potential layout, at least in part, based on the summarized data.

16. A computer-usable medium having computer-readable program code embodied therein for causing a computer system to perform a method of automatically reordering variables, the method comprising:
as a part of compilation,
identifying a set of variables that are candidates for reordering, wherein the candidate variables are associated with one or more source code files that are being compiled;
collecting data for determining a potential layout for the candidate variables;
as a part of linking,
determining the potential layout based, at least in part, on the data, wherein the data is used to partition the candidate variables into categories and enables reordering the candidate variables within their respective categories; and
reordering the candidate variables based, at least in part, on the potential layout.

17. The computer-usable medium of claim 16, wherein the computer-readable program code embodied therein causes a computer system to perform the method, and wherein determining the potential layout further comprises:
selecting the next variable to associate with a virtual cache line based on more than one variable already associated with the virtual cache line; and
indicating that the selected variable is the next variable associated with the potential layout.

18. The computer-usable medium of claim 16, wherein:
the method further comprises, partitioning the candidate variables into the categories, based at least in part on the data, wherein the categories include at least one of a small read-only category, a large read-only category, a small writeable category, a large initialized writeable category, and a large uninitialized writeable category; and
the step of determining further comprises, determining the potential layout, at least in part, based on the categories of the candidate variables.

19. The computer-usable medium of claim 16, wherein the data includes at least one of variable access counts, variable affinities, variable alignment constraints, variable classifications, and the candidate variables.

20. The computer-usable medium of claim 19, wherein the variable classifications includes at least one of variable size, initialization class, and storage class.

21. The computer-usable medium of claim 16, wherein the data is stored in one or more object files associated with the one or more source code files, wherein the computer-readable program code embodied therein causes a computer system to perform the method, and wherein the method further comprises:
transmitting the data to a linker by transmitting the object files to the linker.

22. The computer-usable medium of claim 16, wherein the computer-readable program code embodied therein causes a computer system to perform the method, and wherein:
the method further comprises, summarizing, during linkage, the data associated with the one or more source code files; and
the step of determining further comprises, determining the potential layout, at least in part, based on the summarized data.

* * * * *